United States Patent [19]
Baker et al.

[11] Patent Number: 5,544,232
[45] Date of Patent: Aug. 6, 1996

[54] CALL DISTRIBUTOR WITH AUTOMATIC PREANNOUNCEMENT SYSTEM AND METHOD

[75] Inventors: Daniel F. Baker, Rolling Meadows; Joseph C. Steinlicht; Thomas S. Holtaway, both of Glen Ellyn, all of Ill.

[73] Assignee: Rockwell International Corporation, Seal Beach, Calif.

[21] Appl. No.: 488,709

[22] Filed: Jun. 8, 1995

Related U.S. Application Data

[63] Continuation of Ser. No. 977,779, Nov. 19, 1992, abandoned.

[51] Int. Cl.$^6$ .................................................. H04M 1/64
[52] U.S. Cl. ............................ 379/67; 379/210; 379/265; 379/309
[58] Field of Search .................................. 379/67, 88, 89, 379/210, 211, 212, 265, 266, 309, 214

[56] References Cited

U.S. PATENT DOCUMENTS

| | | | |
|---|---|---|---|
| 4,623,761 | 11/1986 | Winter et al. | 379/84 |
| 4,697,282 | 9/1987 | Winter et al. | 379/67 |
| 5,062,103 | 10/1991 | Davidson et al. | 379/265 |
| 5,289,523 | 2/1994 | Vasile et al. | 379/265 |
| 5,297,195 | 3/1994 | Thorne et al. | 379/88 |
| 5,309,505 | 5/1994 | Szlam et al. | 379/265 |

*Primary Examiner*—Jeffery Hofsass
*Assistant Examiner*—Fan Tsang
*Attorney, Agent, or Firm*—C. B. Patti; G. A. Montayne

[57] ABSTRACT

An automatic call distributor (20) connected with a plurality of agent telephonic sets (12) for audio communication with customers at customer telephonic sets (16) of an external telephonic switching system (18), visual displays (32) on the agent telephonic sets (12) for display of information concerning customers with an automated preannouncement system (10) having a hard disk (25) for storing preannouncement voice messages in a voice of a particular agent, a sign-in code stored in a main memory (24) of the automatic call distributor (20) associated with the particular agent, a key pad (34) at the agent sets (12) for entering in a sign-in code, and a digital audio source card circuit (30) for playing a preannouncement voice message received from the hard disk (25) in the voice of the particular agent associated with the sign-in code to a customer at a customer set (16) connected by the automatic call distributor (20) to the agent set (12) at which the sign-in code of the particular agent has been entered.

35 Claims, 6 Drawing Sheets

CALL DISTRIBUTOR WITH AUTOMATIC PREANNOUNCEMENT SYSTEM AND METHOD

This application is a continuation of application Ser. No. 07/977,779, filed Nov. 17, 1992, now abandoned.

BACKGROUND OF THE INVENTION

1. Field of the Invention

This invention relates generally to the field of automatic telephone call distributors and, more particularly, to an automatic call distributor with an automatic preannouncement system.

2. Description of the Related Art Including Information Disclosed Under 37 C.F.R. Section 1.97–1.99

Automatic call distributors employing a multiport switch controlled by a central processing unit for selectively interconnecting a plurality of agent sets, each having a telephone, with customer telephonic sets of an external telephonic switching system are well known. Examples of such call distributor systems are shown in patent applications U.S. Ser. No. 07/770,197 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992 and U.S. Pat. No. 5,127,004 of Lenihan et al. entitled "Tone and Announcement Message Code Generator for a Telephonic Switching System and Method", issued Jun. 30, 1992.

Typically an agent stationed at an agent set in known distributor systems answers many different types of calls from customers during a work day. In these known systems the agent receives information about the type of customer call on a visual display at the agent set when a call is distributed to the agent. The agent reads the information on the display to determine what type of call (i.e. sales, inventory, customer service, billing etc.) he is receiving. When answering a call the agent greets the caller with a standard greeting which is usually specific to the application being served. For example, an agent may answer a sales call with the greeting, "Welcome to sales. May I help you?" Furthermore, the same agent may also answer calls of a different application such as customer service and present the caller with the standard greeting of "Welcome to customer service. May I help you?"

To help relieve the burden on agents of repeating the same standard greetings hundreds of times during a work shift, the known call distributor systems provide external hardware preannouncers which answer customer calls from customer units of an external network. In one known system, the voice message is stored at the agent set. Each time the agent moves to a different unit, a new voice message must be recorded at the new set which reduces agent efficiency.

A solution to this problem in system in systems with individual preannouncement at each agent set is shown in U.S. patent application Ser. No. 07/926,891 of Zdenek et al., filed Aug. 7, 1992, entitled "Telephonic Console With Prerecorded Voice Message and Method" in which prerecorded voice messages are stored on a memory disk or card which is carried by the agent who prerecorded the message. The memory disk is releasably connectable to any play back unit of any of the agent sets to eliminate the need to re-record the message when there is a change of agents between different agent sets. Since these preannouncers are external and are not internally linked within the system, the agent must remove these disks and carry them when changing shifts or moving from one telephonic agent set to another. This creates a possible risk of an agent misplacing, losing or damaging the external preannouncer disk, the replacement of which is time consuming and costly. Additionally, if the agent forgets to bring the preannouncer memory disk to work or when they shift between agent sets, time must be taken for new messages to be recorded on another disk or for the original disk to be retrieved.

SUMMARY OF THE INVENTION

It is therefore a principal object of the present invention to provide an automatic call distributor with an automated preannouncement system and method in which the disadvantage of known call distributors noted above are overcome by providing means and methods for automatically playing to the callers at each agent set preannouncement messages in the voice of the particular agent selected for each agent set regardless of at which agent set the particular agent is located.

This object is achieved in part by providing an automatic call distributor, having a plurality of agent sets each with a telephone to communicate with customers at customer sets of an external telephonic switching system and a visual display for receipt of information concerning the customers, with an automated preannouncement system comprising means for storing preannouncement voice messages in the voice of a particular agent, means for associating a sign-in code with the particular agent, means for entering in the sign-in code at the agent set, and means responsive to the sign in code to enable the playing of a voice message in the voice of the particular agent associated with the sign-in code to customers connected by the automatic call distributor to the particular agent at the agent set.

The object is also achieved by providing an automatic call distributor, having a plurality of agent sets each with a telephone to communicate with customers at customer telephonic sets of an external telephonic network, with an automated preannouncement system comprising a voice message memory accessible to the plurality of agent sets, means for internally storing in the voice message memory a plurality of different preannouncement voice messages respectively associated with different types of customers, means for determining the type of customer calling from a customer set and means responsive to the determining means for selectively playing to the customer one of the plurality of different preannouncement voice messages associated with the type of customer making the incoming call.

The object is further achieved in part by providing an automatic call distributor, having a plurality of agent sets each with a telephone to communicate with customers and a display screen to obtain visual information relating to customer types at customer telephone sets of an external telephonic network, with an automated preannouncement system comprising means for identifying one of a plurality of different customer types, means for storing a plurality of voice messages and a plurality of associated display screen messages respectively associated with the plurality of different customer types, and means responsive to the customer type identifying means for providing one of the plurality of display screen messages to the display screen of the agent unit associated with the type of customer connected thereto for playing one of the voice messages to the associated customer type.

The object is partly obtained by providing in such an automatic call distributor a method of automatically playing preannouncement messages comprising the steps of (1) storing preannouncement voice messages in a voice of a particular agent, (2) associating a sign-in code with the particular agent, (3) entering a sign-in code at one of the plurality of agent sets, and (4) playing the voice message of the particular agent associated with a sign-in code entered at any one of the plurality of agent sets to customers who have been connected by the automatic call distributor to the one agent set at which the sign-in code of the one particular agent has been entered.

The object is also acquired by providing in such an automatic call distributor a method of automatically playing preannouncement voice messages comprising the steps of (1) internally storing in a memory accessible to a plurality of agent sets a plurality of different preannouncement voice messages respectively associated with different types of customers, (2) determining the type of customer call from one of the plurality of customer telephone sets, and (3) selectively playing to a customer the one of the plurality of different preannouncement voice messages associated with the type of customer determined to be making the incoming call.

The object is further achieved by providing in such a call distributor a method of automatically playing preannouncement messages comprising the steps of (1) identifying one of a plurality of different customer types, (2) storing a plurality of voice messages and corresponding display screen messages respectively associated with the plurality of different customer types, (3) automatically providing a display screen message to the display screen of the agent set associated with the type of customer connected thereto and (4) playing to the connected customer one of the plurality of voice messages which corresponds to the display screen message being provided to the agent set which is associated with the identified customer type of the customer connected thereto.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
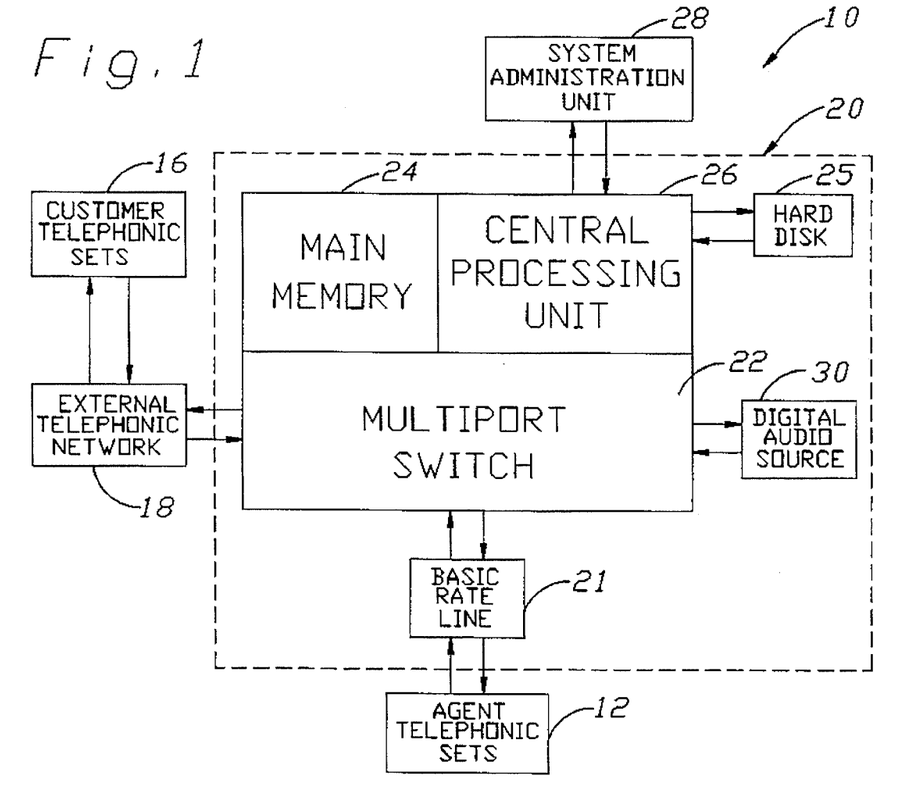
FIG. 1 is a functional block diagram of the preferred embodiment of the automatic call distributor of the present invention as interconnected with a known external telephonic network of customer telephonic units.
Figure 2:
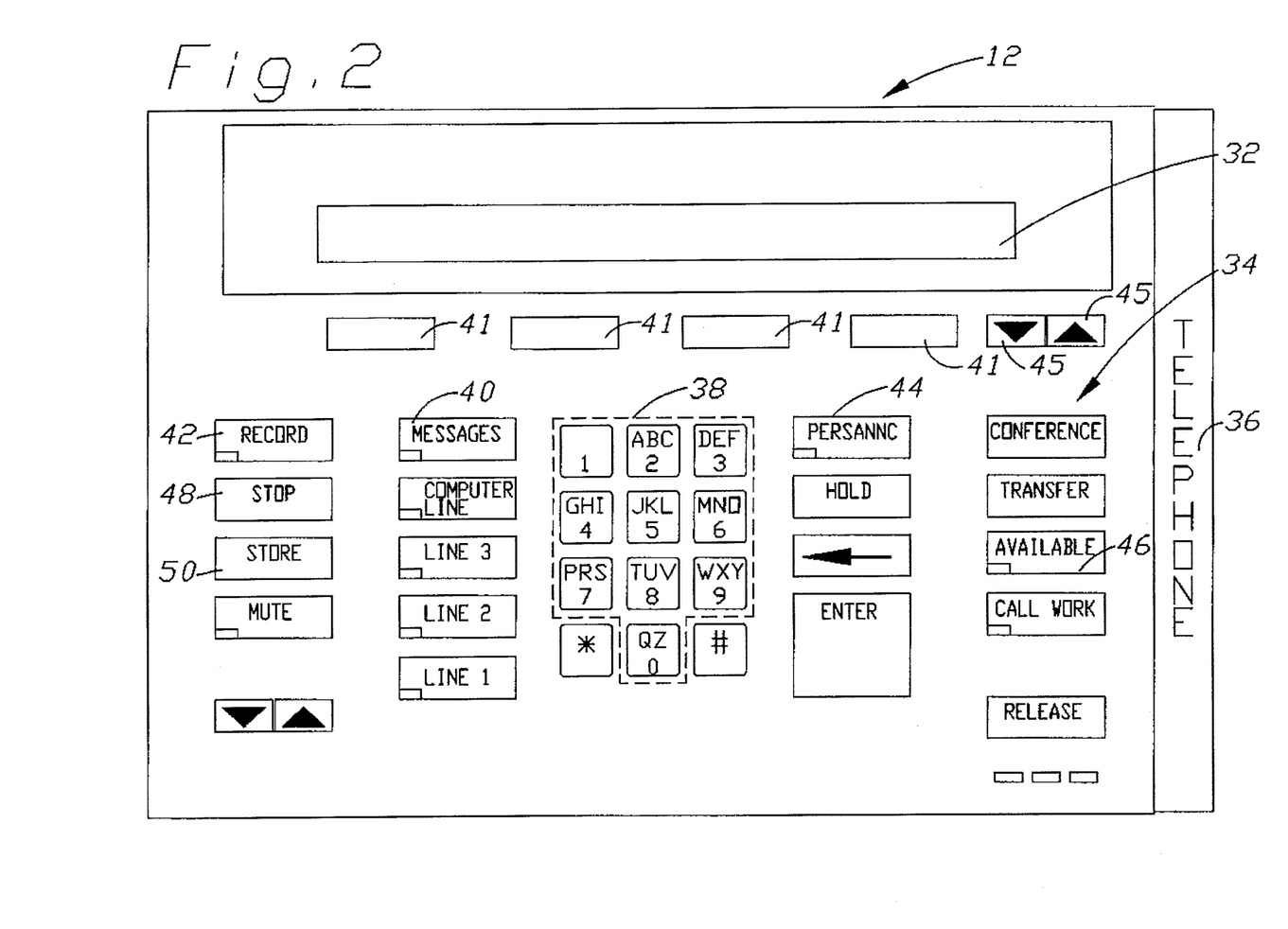
FIG. 2 is a simplified plan view of an agent telephonic set of the automatic call distributor of FIG. 1.

Referring to FIGS. 1 and 2, the automatic call distributor 20 is connected with a plurality of agent telephonic sets 12 which communicate with customers, i.e. any caller of the external network 18, at customer, or external, telephonic sets 16 of an external telephonic network 18. The agent sets 12 have a telephone 36, FIG. 2, for audio communication with the customers of the customer sets 16, FIG. 1. Additionally, the agents sets 12 have a visual display 32, FIG. 2, for receipt of information concerning the customers such as the location of the calling customer or the type of products the customer desires to purchase.

The automated preannouncement system 10, FIG. 1, has means for storing preannouncement voice messages in the voice of the particular agent, i.e. any operator or user of an agent set 12. An agent receives a call from a customer set 16 and is connected to the call at an agent set 12 via a multiport switch 22 of the automatic call distributor 20. The agent telephonic sets 12 are connected to the switch 12 through a basic rate line (BRL) interface card circuit 21. The basic rate line card 21 provides for the termination of Integrated Services Digital Network (ISDN) basic rate links from the switch 22. The links are used in the automatic call distributor 20 of the preferred embodiment to connect the ISDN compatible agent sets 12 into the system 10. A Motorola 68000 microprocessor provides for the overall control of the basic rate line circuit card 21. Generally, while the automated preannouncement system of the present invention can be implemented in numerous types and sizes of call distribution networks, it is preferably employed in a call distribution system of the type shown in patent application U.S. Ser. No. 07/770,197 of Jones, et al. entitled "Multichannel Telephonic Switching Network with Different Signaling Formats and Connect/PBX Treatment Selectable for Each Channel", filed Oct. 2, 1992; U.S. Pat. No. 5,140,611 of Jones, et al. entitled "Pulse Modulated Self-Clocking and Self-Synchronizing Data Transmission and Method for a Telephonic Communication Switching System", issued Aug. 18, 1992; and U.S. Pat. No. 5,127,004 of Lenihan, et al. entitled "Toner and Announcement Message Code Generator for a Telephonic Switching System and Method" issued Jun. 30, 1992

To store a voice message, the agent enters an assigned sign-in code by actuating appropriate numbered keys 38, FIG. 2, on the keypad 34 located on the agent set 12. The agent is assigned an associated sign-in code which is stored in the main memory 24, FIG. 1, of the automatic call distributor 20 at initialization of the system. A system administrator enters in a sign-in code number for each agent at a system administration unit 28 connected with the central processing unit 26 of the call distributor 20 (ACD). The system administration unit 28 is preferably a cathode ray tube (CRT) terminal or a personal computer (PC) and has a keyboard (not shown) for entry of information to the system main memory 24. Using keyboard at the administrator unit 28, the number of and the type of preannouncement voice messages that are assigned to a particular agent is entered into the CPU 28. For example, a particular agent is selectively assigned two preannouncement voice messages, one for sales calls, and another for subscription calls. Alternatively, another agent may also service billing calls and is assigned an additional billing preannouncement voice message. In the preferred embodiment, an agent records up to six voice messages which have a maximum duration of six seconds each.

The system administrator programs the central processing unit 26 by assigning each agent sign-in code number a set of preannouncement voice messages allowed for recording that correspond to the types of customer calls which the particular agent has connected through the ACD 20. This information is entered into the system administration unit 28 and is stored in the memory 24 associated with the central processing unit 26. The central processing unit (CPU) 26 is the primary controller for the automatic call distributor system 20. In the preferred embodiment, the processing power for the CPU 26 is provided by a 32 bit Motorola 68030 microprocessor.

In response to the agent signing in on the key pad 34 of the agent set 12, a menu appears on the visual display 32, FIG. 2, of the set. The agent accesses the voice message menu by actuating the messages key 40 on the key pad 34 of the agent set 12. The agent receives information through the visual display 32 pertaining to his assigned announcements. Only those messages allowed to be recorded appear on the agent set 12 visual display 32 for a particular agent in response to receipt of the agent sign-in code number. The agent records a preannouncement voice message by actuating a RECORD key 42 on the agent set and announces the message into a telephone 36 handset or headset at the agent set. An alternative means of initiating the recording and storing of the preannouncement voice messages is done through actuation of soft keys 41 in which the executed function for the key 41 varies as the menu changes and appears on the LCD display 32. The preannouncement voice message is recorded and digitally stored at the system hard disk 25 using binary pulse coded modulation.

The agent accesses submenus on the LCD visual display 32 through the keypad 34 to record new preannouncement voice messages or to listen to previously recorded messages. In response to receipt of a particular agent sign-in code at the central processing unit 26, FIG. 1, the existing recorded voice announcements for the particular agent are down loaded from the system hard disk 25 to a digital audio source card (DAS) 30. The hard disk 25 in a magnetic recording medium which digitally stores all the recorded preannouncement voice messages received from the DAS card 30. The storage capacity of the hard disk 25 in the preferred embodiment ranges from 300 mega byte to 1.2 giga-byte of memory. Alternative memory capacities can be utilized for storage without departing from the scope of the invention. Each recorded preannouncement voice message is stored as a file at the hard disk 25. The digital audio source card 30 allows the recording of messages for the purpose of preannouncement voice message features, DTMF and MF digit transmission, message transmission and tone transmission. The received analog audio voice from the agent is converted into a digital signal by pulse code modulation. A message for recording, announced by an agent at an agent set 12 is converted to a digital signal and transferred to the DAS 30 via the switch 12. The digital voice message is up loaded to the hard disk 25 for accessible storage. The digital audio source circuit 30 includes a Motorola 68000 microprocessor operating from a 10 MHz clock to provide the overall controlling functions of the DAS circuit. The DAS card circuit 30 additionally includes an eight megabyte RAM for storage of preannouncement voice messages down loaded from the hard disk 25 upon receipt of an agent sign-in code at the ACD 20. A description of the general operation of the DAS card circuit 30 can be found at with reference to U.S. Pat. No. 5,127,004 of Lenihan et al. entitled "Tone and Announcement Message Code Generator For a Telephonic Switching System and Method" issued Jun. 30, 1992.

Once a preannouncement voice message is recorded at an agent set 12, the message is up loaded from the DAS card 30 to the system hard disk 25. A preannouncement voice message number is stored in the main memory 24 of the CPU 26 which corresponds to the recorded and up loaded preannouncement voice message. The preannouncement voice message number represents the particular agent making the recording and the type of customer call to which the preannouncement message is responsive (i.e. a sales message for a sales call). In response to the agent sign-in code being entered at one of the plurality of agent sets 12, a preannouncement voice message of the particular agent associated with the sign-in code is played to a customer connected by the automatic call distributor 20 to the agent set 12 at which the signing code was entered. Therefore, upon a customer call being distributed to a particular agent the down loaded preannouncement voice message at the DAS card 30 corresponding to the call is played at the connected customer set 16 and the agent set 12. For example, a customer calling a sales department to make a purchase will receive a stored preannouncement voice message in the voice of the agent at the particular agent set 12 to which the call is connected stating "Welcome to the sales department. How many items would you like to purchase?".

The automated preannouncement system 10 correlates the different preannouncement voice messages with the different type of customers upon receipt of an incoming call through a Dialed Number Identification Service (DNIS) number. It is common practice for many long distance telephone carriers to assign a DNIS number to various 1-800 or toll free telephonic calls coming in through the external network 18, such as American Telephone and Telegraph Co., MCI, Sprint and Northern Telecom. Different 1-800 customer calls are assigned a different corresponding DNIS number which indicates or identifies the type of call, or type of customer, which has reached the multiport switch 22. For example, a customer dialing a New York toll-free number for airline ticket sales, has an assigned DNIS number corresponding to the called dialed number. The DNIS number and the customer call are carried concurrently to the switch 22. In this ACD 20, the receipt of the DNIS number at the automatic call distributor 20 would provide the identification of the dialed number being a sales call for airline tickets from a New York customer and thus would identify the type of customer. Various DNIS numbers are assigned to certain voice messages in order to provide responsive preannouncement messages. Therefore, receipt of a New York airline ticket sales DNIS number will trigger a preannouncement voice message such as: "Welcome to airline ticket sales. From which airport in New York would you like to depart?". Preferably, the preannouncement voice message is played at both the customer set 16 and the agent set 12, so that the preannouncement not only automatically greets the customer but also informs the agent as to the type of customer call being connected at the agent telephonic set 12. This reduces the hold time a customer waits for an agent, since the agent does not have to read identification information on the visual display 32 in order to determine the type of customer before answering the connected customer call and enables the employment of blind agents.

The preannouncement voice messages are correlated with information concerning the customer that is displayed on the visual display 32 of the agent sets 12. This information concerning the customer (i.e. sales, customer service, billing, etc.) is visually displayed at the agent set while the preannouncement voice message is automatically played at the connected customer set 16 and the agent set 12 servicing the call. A system administrator enters the visually displayed information messages at the system administration unit 28 which are stored in the main memory 24 via the central processing unit 26. The system administrator programs the central processing unit to display at the agent set 12 the information message corresponding to a particular customer call in response to the call being distributed at the agent set. The information message informs and identifies to the agent the type of customer call being connected at the agent set by identifying the customer type. The displayed information aids the agent in responding to the connected call.

An alternative means for associating different stored preannouncement voice messages with different types of customer calls is done by a customer inserting identification information through the customer set 16 based on prompts received from the ACD 20. The customer inserts information, such as a credit card number, through the numbered key pad on the customer telephonic set 16 in response to a prompt message from a tape player or voice response unit (not shown) upon connection to the automatic call distributor 20. This information received at the call distributor 20 identifies the type of call or customer, such as a gold card customer. Thus, upon receipt of this information, the central processing unit 26 initiates the playing of an appropriate preannouncement voice message in the voice of the particular agent receiving the call. Alternatively, a customer call is identified by designating certain trunks or trunk groups on the switch to represent certain types of calls during the installation of the automatic call distributor 20. A call received on a particular trunk indicates the call type or geographical origin. The central processing unit 26 is programmed to initiate the playing of a responsive preannouncement voice message in the voice of the agent receiving the call in response to connection of the call.

There are different preannouncement voice messages stored at the hard disk 25 which are respectively associated with the different types of customers or customer calls. A plurality of preannouncement voice messages are recorded to be responsive to the different types of calls received, such as sales calls, billing calls, payroll calls, subscription calls, customer service calls, etc. The multiple preannouncement voice messages are stored in a plurality of different agent voices. Different agents record and store a plurality of different preannouncement voice messages in their own voice. The preannouncement voice message played to the customer at a customer set 16 is in the same voice of the particular agent located at an agent set 12 to which the call is distributed and connected. The hard disk 25 stores many identically worded message announcements recorded from different agents in the different agent voices. For example, two different agents each record an identical message announcement for a sales call, each announcing "Welcome to sales. May I help you?". The identically worded message is stored in the particular voice of each agent making the recording.

The automatic call distributor 20 directs a call received from a customer set 16 to a particular agent at an agent set 12 assigned to service certain customer calls. The assigning of certain calls to particular agents is done by a system administrator through the system administration unit 28. One of the plurality of preannouncement voice messages is selected from those stored at the hard disk 25 in the voice of the particular agent with the entered sign-in code upon the connection of the customer call to the particular agent. The customer set 16 connected through the automatic call distributor 20 is played the one selected preannouncement voice message in the voice of the particular agent associated with the sign-in code entered at the agent set 12. The preannouncement voice message played corresponds to the type of customer call; a sales preannouncement voice message is played at a customer set in response to receipt of a sales call at the automatic call distributor.

The hard disk 25 internally stores in the ACD 20 the different preannouncement voice messages which are respectively associated with the different types of customers. The hard disk memory 25 is accessible to all the agent sets 12. Thus, an agent accesses his assigned stored messages by signing-in at any of the plurality of agent sets. In response to the central processing unit 26 determining or identifying the type of customer calling from a customer telephone set 16 the DAS card 30 plays to the customer one of the different preannouncement voice messages associated with the particular type of customer making the call. Information concerning the customer making the incoming call is visually displayed at the display screen 32 of the agent set 12 while the preannouncement voice message is played to the customer. This stored customer information is in the form of a display screen message respectively associated with the plurality of different customer types. In response to the central processing unit 26 identifying the type of customer making the call, one of the display screen messages stored in the main memory 24 and associated with the type of customer is provided to the display screen 32 of the agent unit 12. A voice message associated with the customer type of call and in the voice of the agent receiving the call is also played to the customer set 16 through a speaker (not shown). The automated preannouncement system 10 correlates and plays a different preannouncement voice message to a customer set 16 and to the connected agent set 12 in response to receipt of a different type of customer call.

Figure 4A:
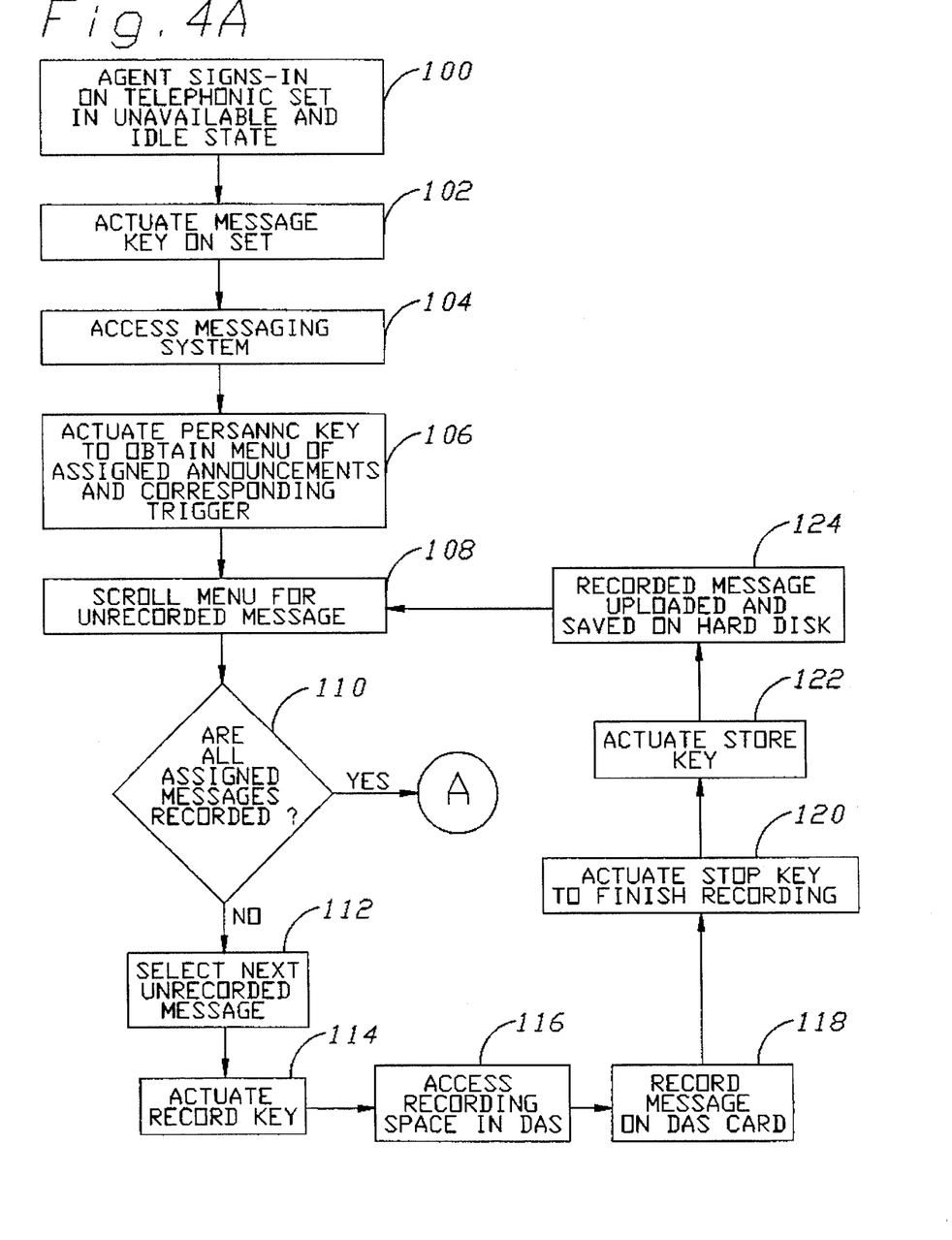
FIGS. 4A and 4B are flow charts of the preferred method of recording and playing back the voice messages through interaction between an agent at an agent set and the central processing unit of FIG. 1.
Figure 4B:
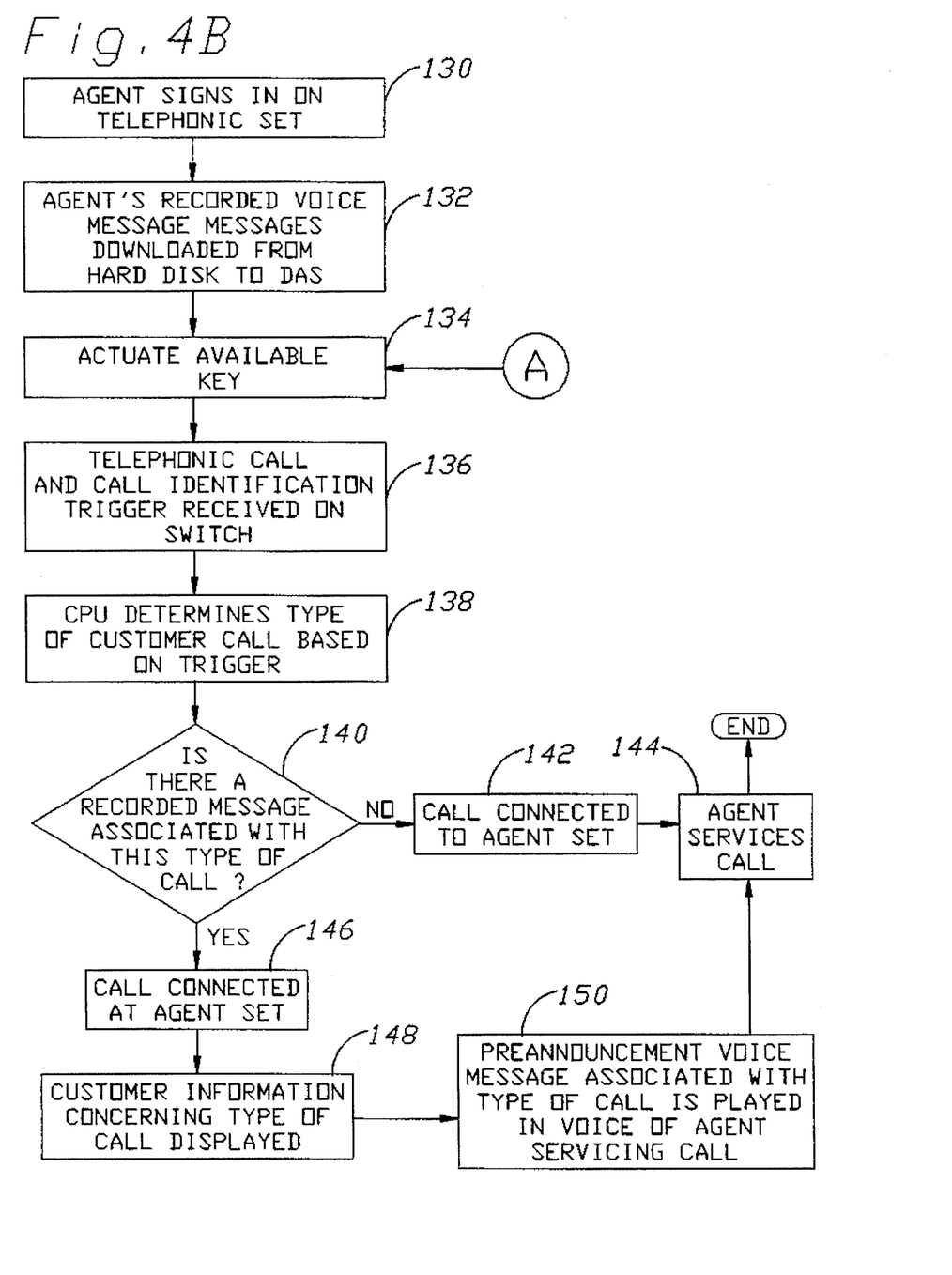

The agent personal preannouncement voice message is recorded on the DAS 30, and stored on the hard disk 25 by a message loader program, FIGS. 4A and 4B. On every sign-in, any recorded announcements for the current group assignment for the agent are downloaded to the DAS 30 from the hard disk 25 by the message loader. When an agent records a new announcement, or modifies an existing one, that announcement is stored on the hard disk 25.

Figure 3A:
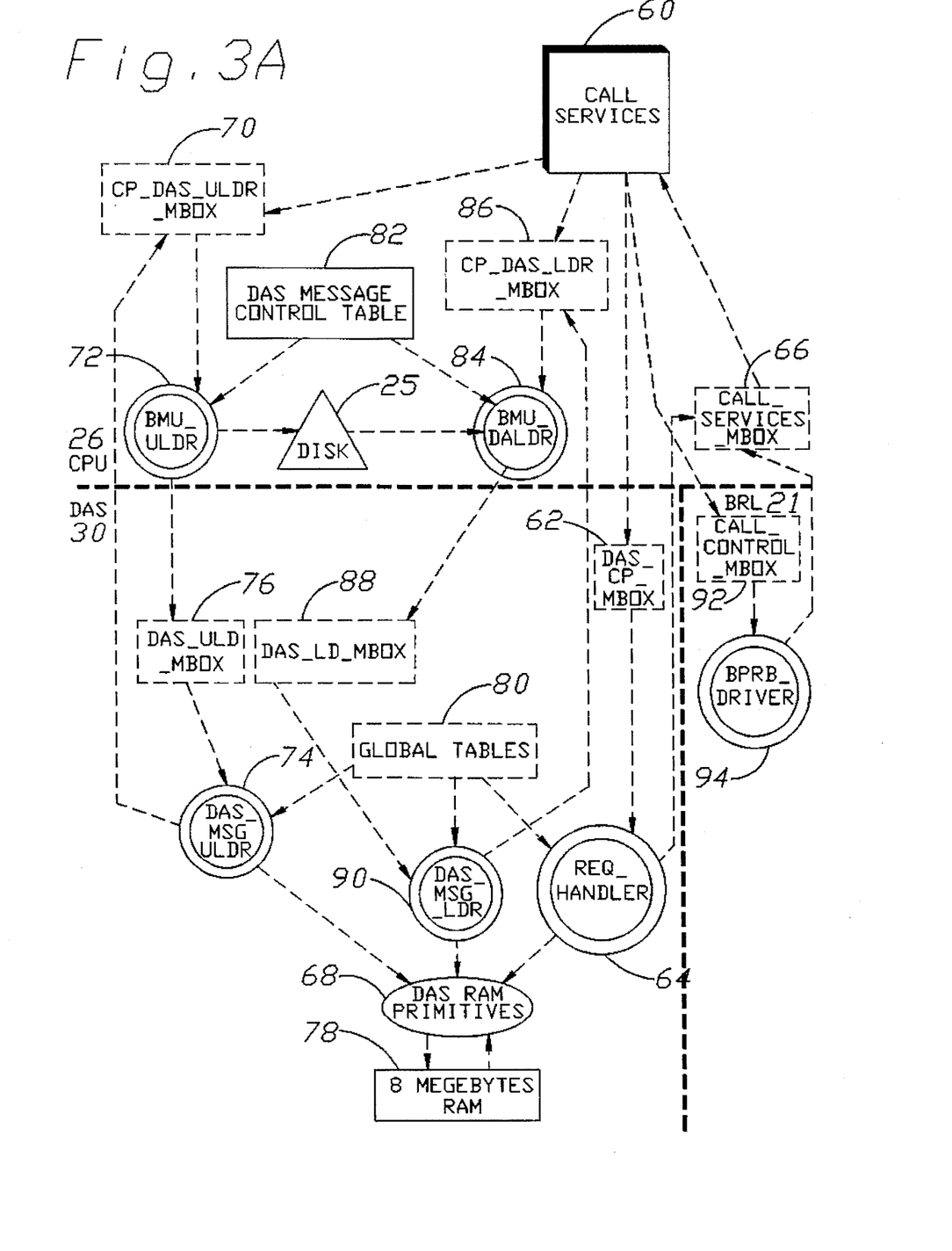
FIG. 3A is a flow control diagram of the interrelationship between the software components of the automatic call distributor of FIG. 1 employed in the automated preannouncement system.
Figure 3B:
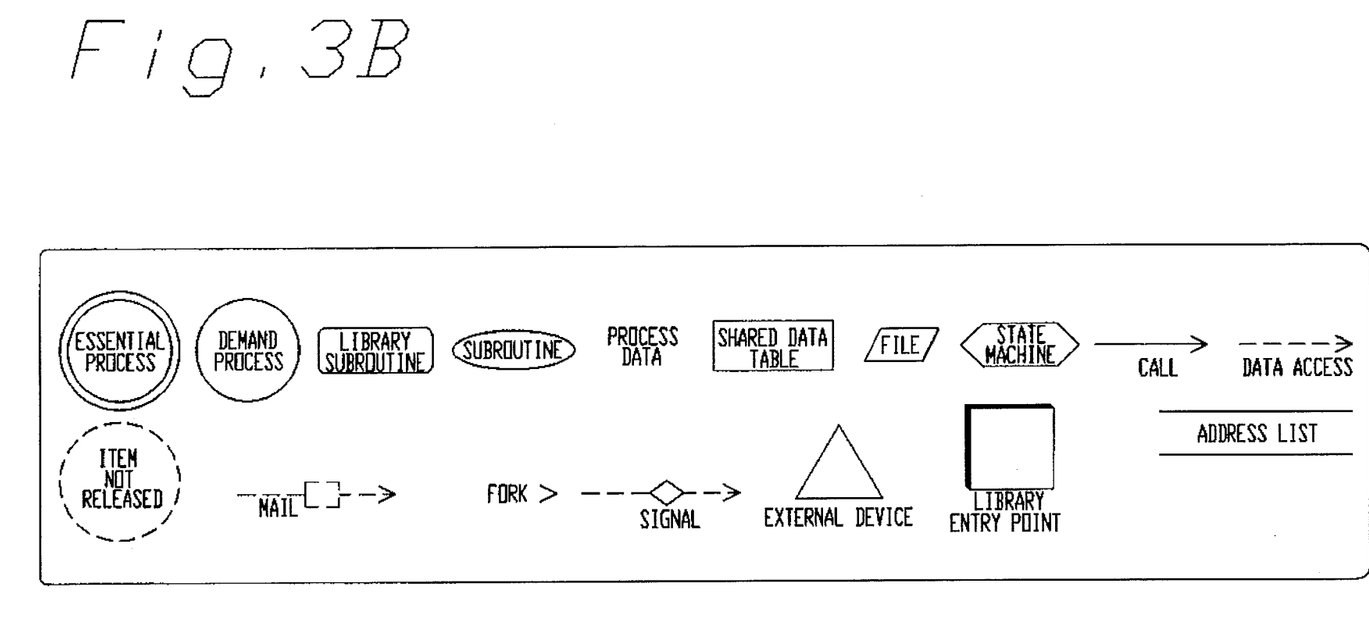
FIG. 3B is a legend for the computer program software component symbols used in FIG. 3A.

Referring to FIG. 3A, the Call Services 60 library state machines cooperate to request the recording of a personal announcement. Call Services 60 requests that the DAS 30, FIG. 1, allocate memory for the preannouncement feature upon sign-in. That request is sent through DAS_CP_MBOX 62, FIG. 3A, which is read by the req_handler 64 process on the DAS.

The req_handler 64 allocates DAS memory as requested, and send a response back to Call Services through the CALL_SERVICES_MBOX 66. The req_handler 64 process allocates DAS memory by using DAS RAM primitives 68.

The requests to start recording and stop recording are also sent through the DAS_CP_MBOX 62 to the req_handler 64, and the responses are also returned through the CALL_SERVICES_MBOX 66. The DAS RAM primitives 68 subroutine are also used to start and stop the recording.

Call Services up loads the recorded announcement to the hard disk 25, FIG. 1, by sending a request to the CP_DAS_ULDR_MBOX 70. Requests are read from this mail box by the bmu_uldr 72 process, which controls the uploading. The bmu_uldr 72 process cooperates with the das_msg_uldr 74 process which reads from the DAS_ULD_MBOX 76.

The das_msg_uldr 74 process accesses an announcement on the DAS memory 78 by using the DAS RAM primitives 68 subroutine and the global DAS tables 80. The das_msg_uldr 74 sends the message back the to bmu_uldr 72 piece by piece in messages sent through the CP_DAS_ULDR_MBOX 70 on the central processing unit 26.

The bmu_uldr 72 writes the message to the hard disk 25 and stores information about the message in a message control shared data table 82.

Movement of messages from the disk 25 to the DAS 30 is controlled by the Call Service state machine 60 which allocates space by sending events to the DAS_CP_MBOX 62, and then requesting the bmu_dnldr 84 process to move the message to disk. These requests are sent to the bmu_dnldr 84 through the CP_DAS_LDR_MBOX 86.

The bmu_dnldr 84 process uses information in the message control table 82 to get the message from the hard disk 25. The message is sent piece by piece in events to the DAS_LD_MBOX 88, from which they are read by the das_msg_ldr 90 process. The das_msg_ldr 90 process uses the DAS RAM primitives 68 subroutine to write the messages to the DAS memory 78.

The das_msg_ldr 90 sends responses back to the bmu_dnldr 84 through the CP_DAS_LDR_MBOX 86.

Events are sent from the BRL 21 to the central processing unit 26 CALL_SERVICES_MBOX 66 to setup a call to the Messages key 40, FIG. 2, on an agent telephonic unit 12. The BMU or CPU Call Services capabilities control the menus on an agent unit 12 through events sent to the CALL_CONTROL_MBOX 92 on the BRL 21. These are events read by the bprh_driver 94 essential task, which calls the appropriate key filter or menu handler state machines. The Agent Voice Services Main and Sub Menu Handlers interacts with an agent recording, playing and erasing their personal announcement messages.

While the advantages of the invention are preferably obtained with the automatic call distributor 20 described above with reference to FIG. 1, the method of the invention can be practiced with any other automated call distributors having a switch for selectively interconnecting a plurality of agent sets with customer sets of an external telephonic switching system network. In any event, the preferred method of practicing the invention comprises the steps of (1) storing preannouncement voice messages in a voice of a particular agent, (2) associating a sign-in code with the particular agent, (3) entering the sign-in code at any one of the plurality of agent sets, and (4) playing a voice message of the particular agent associated with the sign-in code entered at any one of the plurality of agent sets to customers who have been connected by the automatic call distributor to the one agent set at which the sign-in code of the one particular agent has been entered.

Also, a method is provided of automatically playing preannouncement voice messages comprising the steps of (1) internally storing in a memory accessible to a plurality of agent sets a plurality of different preannouncement voice messages respectively associated with different types of customers, (2) determining the type of customer call from one of the plurality of customer telephone sets, and (3) selectively playing to a customer the one of the plurality of different preannouncement voice messages associated with the type of customer determined to be making the incoming call.

Also, preferably performed are the steps of (1) storing a plurality of voice messages and corresponding display screen messages respectively associated with a plurality of different customer types, (2) automatically providing one of the plurality of display screen messages to the display screen of the agent set associated with the type of customer connected thereto, and (3) playing to the connected customer one of the plurality voice messages which corresponds to the display screen message being provided and is associated with the customer type in response to receipt of information identifying the identified customer type.

Referring to FIG. 4A, the method of recording and storing a plurality of preannouncement voice messages is done in the automatic call distributor 20 by an agent entering a sign-in code at an agent telephonic set 12 while in an idle and unavailable state to service customer calls, as seen in step 100. In step 102, the Messages key 40, FIG. 2, on the agent set 12 is actuated and the central processing unit 26 accesses the messaging system software in step 104, FIG. 4A, to perform recording. In step 106, the agent actuates the Persannc Key 44, FIG. 2, to obtain a menu of the preannouncement voice messages and the corresponding trigger number which are assigned to the particular agent and are shown on the visual display 32.

A sign-in code is associated with each particular agent and stored in the main memory 24 of the automatic call distributor 20 through the system administrator unit 28. The system administrator assigns the messages for recording which correspond to different types of received calls from the customer telephonic sets 16. The agent records a message as directed by the menu appearing at the visual display which is responsive to a particular type of customer call identified by a trigger received at the automatic call distributor. In step 108, FIG. 4A, the agent scrolls the visually displayed menu using a scroll key 45, FIG. 2, on the agent set 12 to obtain an unrecorded message.

In step 110, FIG. 4A, the agent determines if all the assigned messages are recorded. If all the assigned preannouncement voice messages are recorded by the agent, then the agent is prepared to service incoming customer calls. The agent goes from the unavailable or idle state by actuating an Available Key 46, FIG. 2, on the agent set 12 to become available to receive and service customer calls, as seen in step 134 of FIG. 4B. If all the messages assigned to the agent are not recorded, then in step 112, FIG. 4A, the agent selects the next unrecorded message from the menu on the display screen 32, FIG. 2, by utilizing the scroll keys 45.

In step 114, the RECORD key 42, FIG. 2, is actuated to indicate the recording of the preannouncement voice message. In response to the actuation of the RECORD Key 42, recording space is made available in the memory of the Digital Audio Source Card 30, FIG. 1, as seen in step 116, FIG. 4A. In step 118, the agent announces the appropriate voice message into a telephone 36, FIG. 2, handset or headset at the agent telephonic set 12, and the message is recorded on the DAS card 30. The stop key 48, FIG. 2, is actuated upon completion of the recording of the voice message in step 120. In step 122, FIG. 4A, the store key 50 is actuated to store the recorded preannouncement voice message in the voice of the agent at the set 12. In step 124, FIG. 4A, the recorded message is up loaded from the DAS 30, FIG. 1, and saved at the hard disk 25. The preannouncement voice message is digitally stored at the hard disk through the use of pulse coded modulation.

After completing the recording of a voice message the agent returns to step 108, FIG. 4A, to scroll the menu to record and store different preannouncement voice messages respectively associated and responsive to different types of customer application calls. The hard disk 25 internally stores multiple preannouncement voice messages in different voices which correspond to the different agents recording the voice messages. The hard disk 25 memory is accessible to the plurality of agent sets 12, FIG. 1, for storing the different preannouncement voice messages. Often, these stored preannouncement voice messages are identically worded message announcements recorded in the voices of the different agents.

Referring the FIG. 4B the method of automatically playing preannouncement voice messages is accomplished by the agent signing-in on the numeric key 38, FIG. 2, of the agent telephonic set 12, as seen in step 130. In response to the agent signing in on the telephonic set 12, FIG. 1, the recorded preannouncement voice messages of the agent are down loaded from the hard disk 25 to the digital audio source card 30 as seen in step 132, FIG. 4B. In step 134, the Available Key 46, FIG. 2, is actuated to indicate to the central processing unit 26, FIG. 1, that the agent is available to service incoming customer calls from customer telephonic sets 16. In step 136, FIG. 4B, a customer telephonic call and an appropriate call identification trigger (DNIS number, customer prompt, designated trunk line, etc.) is received on the multiport switch 22, FIG. 1. In response to the call being received on the switch 22, the central processing unit 26 determines the type of customer call based on the received call identification trigger in step 138, FIG. 4B.

In step 140, the central processing unit 26 determines if there is a recorded preannouncement voice message associated with the type of received customer call for the particular signed-in agent. If a different type of customer call is received on the switch 22, the central processing unit 26 associates or correlates a different preannouncement voice message with the different call. If there is no recorded preannouncement voice message associated with the type of customer calling, then the call is connected directly to the agent set 12, FIG. 1, in step 142, FIG. 4B, and the agent services the customer call in step 144.

If there is a recorded message associated with the received customer call, the call is connected to the agent set 12, FIG. 1, in step 146, and information concerning the customer is displayed on the visual display 32 of the agent set, as seen in step 148. This customer information or display screen message is stored in the automatic call distributor 20 main memory 24, FIG. 1, and is respectively associated with the plurality of different customer calls or customer types.

In response to receipt of a call identification trigger the central processing unit 26 automatically provides one of a plurality of display screen messages to the display screen 32, FIG. 2, which is associated with the type of customer call connected to the agent set 12 via the automatic call distributor 20. In step 150, FIG. 4B, the preannouncement voice message associated with the type of customer call is played at both the agent set 12, FIG. 1, and customer set 16, in the voice of the particular agent having entered the sign-in code at the agent set.

The preannouncement voice message is automatically played while the information concerning the customers is visually displayed at the agent set 12 at which the sign-in code is entered. The preannouncement voice message and the displayed information message alert the agent as to the type of customer call connected via the automatic call distributor 20. The agent does not have to repeat the same greeting messages over and over again during the working shift for a variety of different application customer calls. After the preannouncement voice message is played, the agent services the customer call in step 144. An exemplary software listing and description of the exemplary software program in accordance with the present invention is set forth below.

While a detailed description of the preferred embodiment of the invention has been given, it should be appreciated that many variations can be made thereto without departing from the scope of the invention as set forth in the appended claims.

What is claimed is:

1. In an automatic call distributor having a plurality of agent sets each with a telephone to communicate with incoming telephone calls from customers at customer sets of an external telephonic switching system and a visual display for displaying information concerning customers, the improvement being an automated preannouncement system, comprising:

means for storing preannouncement voice messages in different voices of a plurality of different agents respectively;

means for associating a sign-in code with a particular agent of the plurality of different agents;

means at the plurality of agent sets for entering in the sign-in code; and means responsive to the sign-in code entered at any one of the plurality of agent sets to enable at least one of the preannouncement voice messages in the voice of the particular agent associated with the sign-in code to BE automatically played to incoming telephone calls from customers which have been connected by the automatic call distributor to the one of the agent sets at which the sign-in code of the particular agent has been entered and in which the at least one of the preannouncement voice messages is played in the voice of the particular agent connected to the incoming telephone calls upon the initial connection of the incoming telephone calls by the automatic call distributor to the one of the agent sets.

2. The automatic call distributor of claim 1 in which the storing means includes means for digitally storing the preannouncement voice messages in a hard disk associated with a central processing unit in the automated preannouncement system.

3. The automatic call distributor of claim 1 in which the storing means includes means for storing different preannouncement voice messages respectively associated with different types of customers.

4. The automatic call distributor of claim 3 including means for correlating different preannouncement voice messages to different types of customers upon receipt of an incoming call from a different type of customer.

5. The automatic call distributor of claim 1 including means for correlating the preannouncement voice messages with the information concerning the customers that is displayable on the visual display of the agent sets.

6. The automatic call distributor of claim 1 including means for automatically playing a preannouncement voice message while the information concerning customers is visually displayed at the visual display of the one of the agent sets.

7. The automatic call distributor of claim 1 including means for storing multiple preannouncement voice messages in a plurality of different agent voices.

8. The automatic call distributor of claim 7 in which the multiple voice messages storing means includes means for storing a plurality of identically worded message announcements in the different agent voices.

9. The automatic call distributor of claim 8 including means for selecting one of the preannouncement voice messages in the voice of the particular agent with the sign-in code of the particular agent, and means for playing to one of the customer sets connected through the automatic call distributor the one of the preannouncement voice messages in the voice of the particular agent associated with the sign-in code entered at the one of the agent sets.

10. In an automatic call distributor having a plurality of agent sets each with a telephone to communicate with customers at customer telephone sets of an external telephonic network, the improvement being an automated preannouncement system, comprising:

a voice message memory accessible to the plurality of agent sets;

means for internally storing in the voice message memory a plurality of different preannouncement voice messages respectively associated with different types of customers each of the voice messages being generated in a voice of each of a plurality of different agents wherein the preannouncement voice messages are played to the customer sets upon initial connection of incoming calls to the agent sets;

means for determining the type of a customer making an incoming call from one of the customer telephone sets;

means for connecting an incoming call to one selected agent of a plurality of different agents; and means responsive to the determining means and the connecting means for automatically selectively playing to the customer and to the one selected agent one of the plurality of different preannouncement voice messages associated with the type of the customer making the incoming call and in voice of the one selected agent connected to the incoming call upon the initial connection of the incoming call to the one agent.

11. The automatic call distributor of claim 10 in which the storing means includes means for digitally storing the different preannouncement voice messages in a hard disk associated with a central processing unit in the automated preannouncement system.

12. The automatic call distributor system of 10 in which the automated preannouncement system includes means for visually displaying on one of the agent sets information concerning the customer calling from one of the customer telephone sets while the one of the plurality of different preannouncement voice messages is played to the customer and to the one agent upon initial connection of a incoming call to the agent.

13. The automatic call distributor of claim 10 in which the selectively playing means includes means for associating a sign-in code with the particular agent, means at the agent sets for entering in the sign-in code, and means responsive to the sign-in code entered at the agent set to enable the preannouncement voice message in the voice of the particular agent associated with the sign-in code to be played to the customer connected through the automatic call distributor to the particular agent.

14. In an automatic call distributor having a plurality of agent sets each with a telephone to communicate with customers and a display screen to obtain visual information relating to customer types of said customers, the improvement being an automated preannouncement system, comprising:

means for automatically identifying one of a plurality of different customer types for each incoming telephone call, at least one of the plurality of different customer types associated with each of the customers;

means for storing a plurality of preannouncement voice messages and a plurality of associated display screen messages respectively associated with the plurality of different customer types, each of the preannouncement voice messages being in a voice of one of a plurality of different agents and are to be played prior to the one of the agents talking to the customer;

means for connecting an incoming telephone call from one of the customers to one of the agents; and means responsive to the customer type identifying means and the incoming telephone call connecting means for automatically providing one of the plurality of display screen messages to the display screen of one of the agent sets associated with the one of the customer types connected thereto and for automatically playing one of the plurality of preannouncement voice messages to a customer associated with the one of the customer types in the voice of the one of the agents connected to the incoming telephone call upon the incoming telephone call being initially connected to the one agent set and prior to the one agent talking to the customer.

15. The automatic call distributor of claim 14 in which the automated preannouncement system includes means for digitally storing the voice messages in an announcement memory associated with a central processing unit in the automated preannouncement system.

16. The automatic call distributor of claim 14 in which the automated preannouncement system includes means for automatically playing one of the plurality of voice messages in response to the one message associated with the type of customer visually appearing on the display screen of an agent set.

17. The automatic call distributor of claim 14 in which the selectively playing means includes means for associating a sign-in code with a particular agent, means at the agent sets for entering in the sign-in code, and means responsive to the sign-in code entered at one of the plurality of agent sets to enable one of the plurality of voice messages which is in the voice of the particular agent associated with the sign-in code to be played to the customer connected by the automatic call distributor with the particular agent at the one of the agent sets.

18. In an automatic call distributor having a plurality of agent sets each with a telephone to communicate with incoming telephone calls from customers at customer sets of an external telephonic switching system and a visual display for displaying information concerning customers, the improvement being a method of automatically playing preannouncement messages, comprising the steps of:

storing preannouncement voice messages in different voices of a plurality of different agents respectively;

associating a sign-in code with a particular agent of the plurality of different agents;

entering the sign-in code at one of the plurality of agent sets; and automatically playing one of the preannouncement voice messages in the voice of the particular agent associated with a sign-in code entered at any one of the plurality of agent sets to incoming telephone calls from the customers which have been connected by the automatic call distributor to one of the agent sets at which the sign-in code of the particular agent has been entered and in which the one of the preannouncement voice messages played in the voice of the particular agent is played upon an initial connection of an incoming telephone call by the automatic call distributor to the one agent set at which the sign-in code is entered.

19. The method of claim 18 in which the step of storing preannouncement voice messages includes the step of digitally storing the preannouncement voice messages in a hard disk associated with a central processing unit of the automatic call distributor.

20. The method of claim 18 in which the step of storing preannouncement voice messages includes the step of storing different preannouncement voice messages respectively associated with different types of customers.

21. The method of claim 20 including the step of correlating different preannouncement voice messages to different types of customers upon receipt of an incoming call from a different type of customer.

22. The method of claim 18 including the step of correlating the preannouncement voice messages with the information concerning each of the customers that is displayable on the visual displays of the plurality of agent sets.

23. The method of claim 18 including the step of automatically playing the one of the preannouncement voice messages while the information concerning customers is visually displayed at the visual display of the one of the agent sets in which the sign-in code is entered.

24. The method of claim 18 including the step of storing multiple preannouncement voice messages in a plurality of different voices corresponding to a plurality of different agents.

25. The method of claim 24 in which the step of storing multiple voice messages includes the step of storing a plurality of identically worded message announcements in the plurality of different voices corresponding to the different agents.

26. The method of claim 25 including the steps of selecting one of the preannouncement voice messages in the voice of the particular agent, and playing to one of the customer sets connected to an agent set through the automatic call distributor the one of the preannouncement voice messages in the voice of the particular agent associated with the sign-in code at the agent set.

27. In an automatic call distributor having a memory accessible to a plurality of agent sets each with a telephone to communicate with incoming telephone calls from customers at customer telephone sets of an external telephone network, the improvement being a method of automatically playing preannouncement messages, comprising the steps of:

internally storing in the memory accessible to the agent sets a plurality of different preannouncement voice messages respectively associated with different types of customers, each of the preannouncement voice messages being in a voice of an agent is played to customer telephone sets upon initial connection of incoming calls to an agent set;

determining a type of a customer placing an incoming call from one of the plurality of customer telephone sets;

determining which one of a plurality of different agents will answer the incoming call; and selectively playing to the customer calling from one of the plurality of customer telephone sets, one of the plurality of different preannouncement voice messages associated with the type of customer in the voice of the agent who is determined to answer the incoming call upon the initial connection of the incoming call to the agent prior to the agent talking to the customer.

28. The method of claim 27 in which the step of internally storing different preannouncement voice messages includes the step of digitally storing the different preannouncement voice messages at a hard disk associated with a central processing unit in the automatic call distributor.

29. The method of claim 27 including the step of visually displaying on the agent set information concerning the customer making the incoming call while the preannouncement message is played to the customer.

30. The method of claim 27 in which the step of selectively playing includes the steps of associating a sign-in code with a particular agent, entering in the sign-in code at one of the agent sets, and playing one of the preannouncement voice messages in the voice of the particular agent associated with the sign-in code entered at the one of the agent sets to the customer connected through the automatic call distributor to the particular agent.

31. In an automatic call distributor having a plurality of agent sets each with a telephone to communicate with incoming telephone calls from customers and a display screen to obtain visual information relating to customer types, a plurality of agents being associated with the plurality of agent sets to answer the incoming telephone calls, the improvement being a method of automatically playing preannouncement messages, comprising the steps of:

identifying one of a plurality of different customer types of an incoming call;

storing a plurality of preannouncement voice messages and corresponding display screen messages respectively associated with the plurality of different customer types, each of the preannouncement voice messages being in a voice of one of the plurality of agents respectively;

connecting an incoming call from one of the customers to one of the agents;

automatically providing one of the plurality of display screen messages to the display screen of one of the agent sets associated with the type of customer connected thereto, the one of the agent sets having a particular one of the agents associated therewith; and playing to the customer connected to the one of the agent sets one of the plurality of preannouncement voice messages which corresponds to the one of the plurality of display screen messages being provided to the agent set which is associated with the identified customer type of customer connected thereto and which is in the voice of the particular one of the agents upon the incoming call being initially connected to the one agent set and prior to the one agent talking to the customer.

32. The method of claim 31 including the step of correlating and playing a different voice message to a different type of customer upon receipt of an input from a different type of customer.

33. The method of claim 31 including the step of digitally storing the voice messages in a hard disk associated with a central processing unit in the automated preannouncement system.

34. The method of claim 31 including the step of automatically playing one of the plurality of voice messages in response to the one voice message associated with the type of customer visually appearing on the display screen of an agent set.

35. The method of claim 31 further includes the steps of associating a sign-in code with the particular agent;

entering in the sign-in code at one of the agent sets, and playing the voice message in the voice of the particular agent associated with the sign-in code entered at the one of the agent sets to the customer connected by the automatic call distributor with the particular agent at the one of the agent sets.

* * * * *